(12) United States Patent
Brody et al.

(10) Patent No.: US 8,955,991 B2
(45) Date of Patent: Feb. 17, 2015

(54) INTERACTIVE DISPLAY AND/OR PACKAGING SYSTEM

(71) Applicants: Spencer Brody, Whitehouse Station, NJ (US); Edward Lubowicki, Somerset, NJ (US)

(72) Inventors: Spencer Brody, Whitehouse Station, NJ (US); Edward Lubowicki, Somerset, NJ (US)

( * ) Notice: Subject to any disclaimer, the term of this patent is extended or adjusted under 35 U.S.C. 154(b) by 291 days.

(21) Appl. No.: 13/694,178

(22) Filed: Nov. 2, 2012

(65) Prior Publication Data

US 2014/0125560 A1    May 8, 2014

(51) Int. Cl.

| | |
|---|---|
| G03B 21/28 | (2006.01) |
| G03B 21/00 | (2006.01) |
| G09G 3/00 | (2006.01) |
| G06Q 30/02 | (2012.01) |
| G03B 21/14 | (2006.01) |
| G03B 21/20 | (2006.01) |
| G09F 19/18 | (2006.01) |
| G09F 27/00 | (2006.01) |

(52) U.S. Cl.
CPC .............. *G06Q 30/02* (2013.01); *G03B 21/28* (2013.01); *G03B 21/14* (2013.01); *G03B 21/2066* (2013.01); *G09F 19/18* (2013.01); *G09F 27/00* (2013.01); *G09F 2027/002* (2013.01)
USPC ............... 353/119; 353/98; 353/64; 353/122; 345/32

(58) Field of Classification Search
CPC ..... G03B 21/28; G03B 21/14; G03B 21/2066
USPC .......................... 353/98, 64, 122, 199; 345/32
See application file for complete search history.

(56) References Cited

U.S. PATENT DOCUMENTS 5,552,934 A * 9/1996 Prince ............................ 359/629
5,782,547 A * 7/1998 Machtig et al. .................. 353/28

* cited by examiner

*Primary Examiner* — Toan Ton
*Assistant Examiner* — Magda Cruz
(74) *Attorney, Agent, or Firm* — Henry I. Schanzer (57) ABSTRACT

An enclosure includes an optical structure which divides the enclosure into a front section and a back section which includes a background setting. The enclosure includes a pre-programmed code located along an exterior wall. A smart phone can be used to sense the code and project an image onto the optical structure, which image is reflected enabling a viewer to see the reflected image superimposed on the background setting.

20 Claims, 13 Drawing Sheets

INTERACTIVE DISPLAY AND/OR PACKAGING SYSTEM

This invention claims priority from provisional patent application Ser. No. 61/628,722 titled PACKAGING AND/OR DISPLAY SYSTEM filed Nov. 4, 2011, the teachings of which are incorporated herein by reference.

BACKGROUND OF THE INVENTION

This invention pertains to display and/or packaging systems which may be used to display an image or message interactively and in an interesting and attractive manner.

One aim of the invention is to provide display and/or packaging systems which may be used in the advertising or promotion of goods and/or services, to send messages, greetings or invitations and to enable multi-dimensional forms of communication.

A problem in the field of marketing and sales is to increase sales of a product by increasing the attention a display or package receives from potential customers. It is a common marketing practice to make packages attractive and interesting in order to get the attention and interest of potential purchasers. This technique predisposes customers to purchasing a product because customers are drawn to more attractive packaging and are more likely to examine and then buy the product. Accordingly, an object of this invention is to provide a display and/or packaging system which will invite shopper/user participation in the examination of the display/package to promote the sale of a product, or services or instructions, or promotional materials and/or advertisements associated with the package.

As in the area of advertising, it is often desirable to provide a display/package containing an invitation or an announcement or a greeting or a message in an interesting, novel, and inviting manner. Accordingly, it is also an object of this invention to provide a display and/or packaging system which invites the interactive participation of a recipient or user of the display/package.

BRIEF SUMMARY OF THE INVENTION

A display system embodying the invention includes an enclosure having a front wall, a back wall and two opposite side walls defining an interior space. An optical structure with reflective and transparent properties is positioned between the front wall and the back wall. An input aperture is formed along the front wall of the enclosure for enabling an image projector to project images onto the optical structure which are reflected towards the input aperture. Background scenery is formed between the optical structure and the back wall and is visible when illuminated. A viewing, or output, aperture is located along the enclosure for viewing the superposition of the reflected image and the background scenery, when the background scenery is illuminated.

The optical structure which functions as a reflective and transparent surface located within the enclosure may include a film or sheet of plastic extending across the enclosure, at an angle to the input aperture, or any suitable arrangement of lenses, films or mirrors positioned to receive and reflect images projected at the input aperture while enabling the background scenery to be seen.

In accordance with the invention, an identification (ID) tag may be located at any suitable location on an external wall of the enclosure. The ID tag may include any suitable coded data which may be read or sensed by an image projector. The ID tag may be a bar code, a QR code, an RFID chip or any like indicator containing data associated with the display/package. In accordance with the invention, the image projector includes means responsive to the data of the ID tag to project preselected imaging information via said input aperture at an angle onto the optical structure.

A display or packaging system embodying the invention may include an enclosure of the type describe above and an additional section for holding and displaying a product being offered for sale or for highlighting a service to be rendered or instructions or promotional materials or advertisements associated with the display/package. The enclosure and the additional section may be contiguous sections and/or may be contained within one another.

The ID tag may contain preselected imaging information pertaining to the product or any other information designed to educate or entertain a shopper/user opting to use sensing and imaging apparatus.

In accordance with one aspect of the invention, a shopper may use his or her "smartphone" (or equivalent device) to interrogate (scan) the ID tag (e.g., a QR code) which triggers a series of imaging information which have been prerecorded or which are obtainable with the smartphone. The shopper can then apply and project the imaging information to the input aperture and view the prerecorded images at the output aperture.

BRIEF DESCRIPTION OF THE DRAWINGS

In the accompanying drawings, which are not drawn to scale, like reference characters denote like components.

DETAILED DESCRIPTION OF THE DRAWINGS

Referring to FIGS. 1, 1A, 1B, and 1C there is shown a package 10 having an upper portion 12a and a lower portion 12b. Portion 12b includes a suitable enclosure for holding or containing a product 14. The product 14 may be any selected object; (e.g., it may be a product being offered for sale or to be viewed for promotional or any other reason). In the figures, portion 12b includes a display area (or cut out) 15 to enable the product 14 to be displayed.

Figure 1:
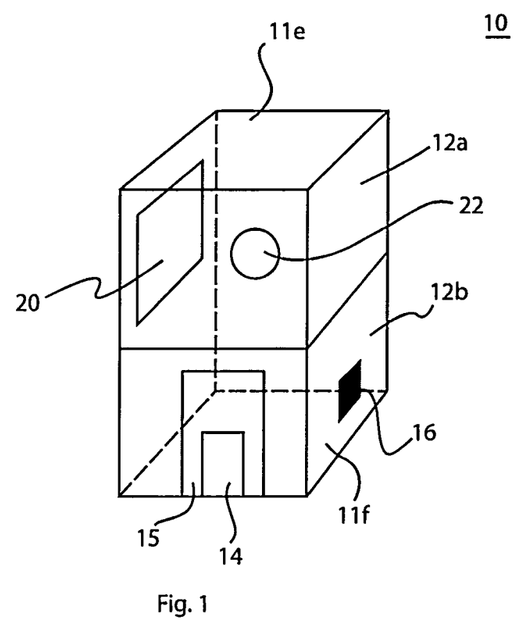
FIG. 1 is a highly simplified isometric drawing of a package embodying the invention.

Portions 12a and 12b may be disposed within the package 10 in any suitable manner. In one embodiment, portion 12b is formed, in a section of the package 10, below section 12a. However, it should be understood that portions 12a and 12b may be formed side by side (in any order) and generally contiguous to each other or as one unit, with one portion being contained within the other, or even with portion 12b formed above portion 12a.

Figure 1A:
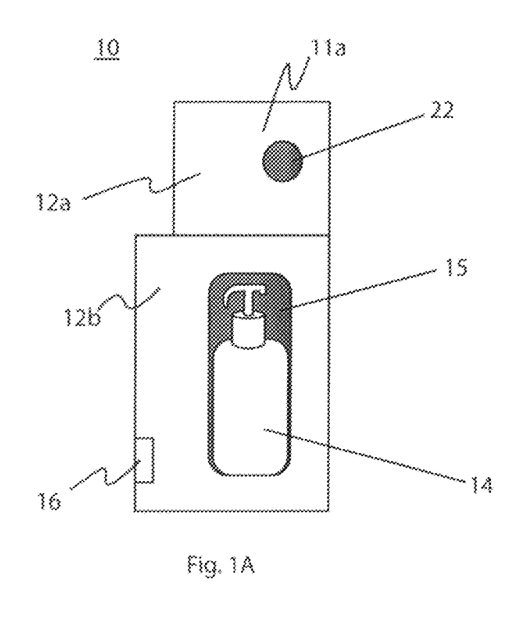
FIG. 1A is a simplified drawing of a side of the package of FIG. 1 showing a product being held and displayed.
Figure 1B:
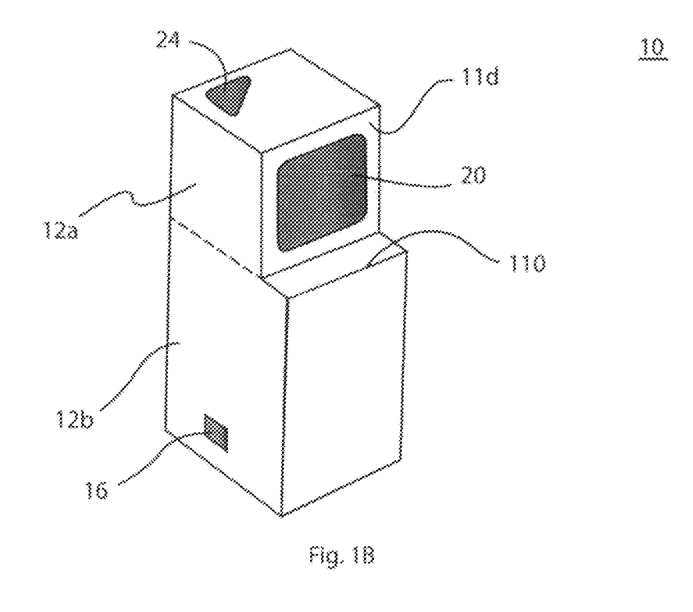
FIG. 1B is a simplified drawing of a side of the package of FIG. 1 showing the input "imaging" side of the package of FIG. 1.
Figure 1C:
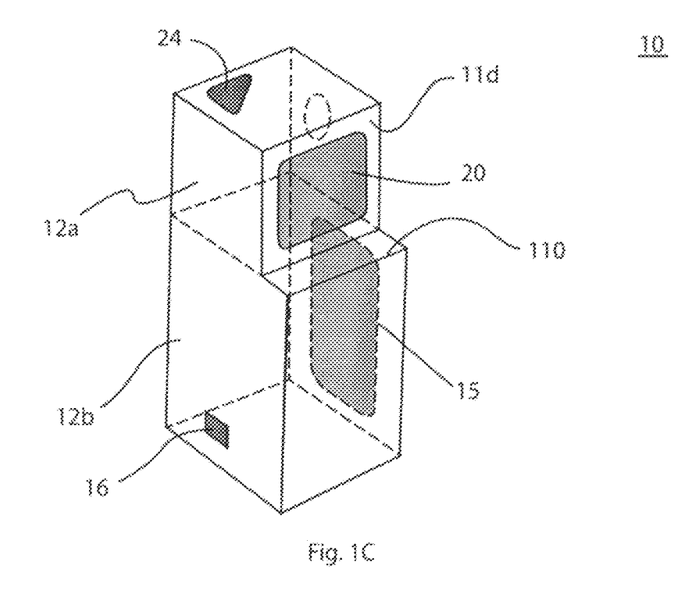
FIG. 1C is a simplified isometric drawing showing the "imaging" and product display sides of the package of FIG. 1.
Figure 1D:
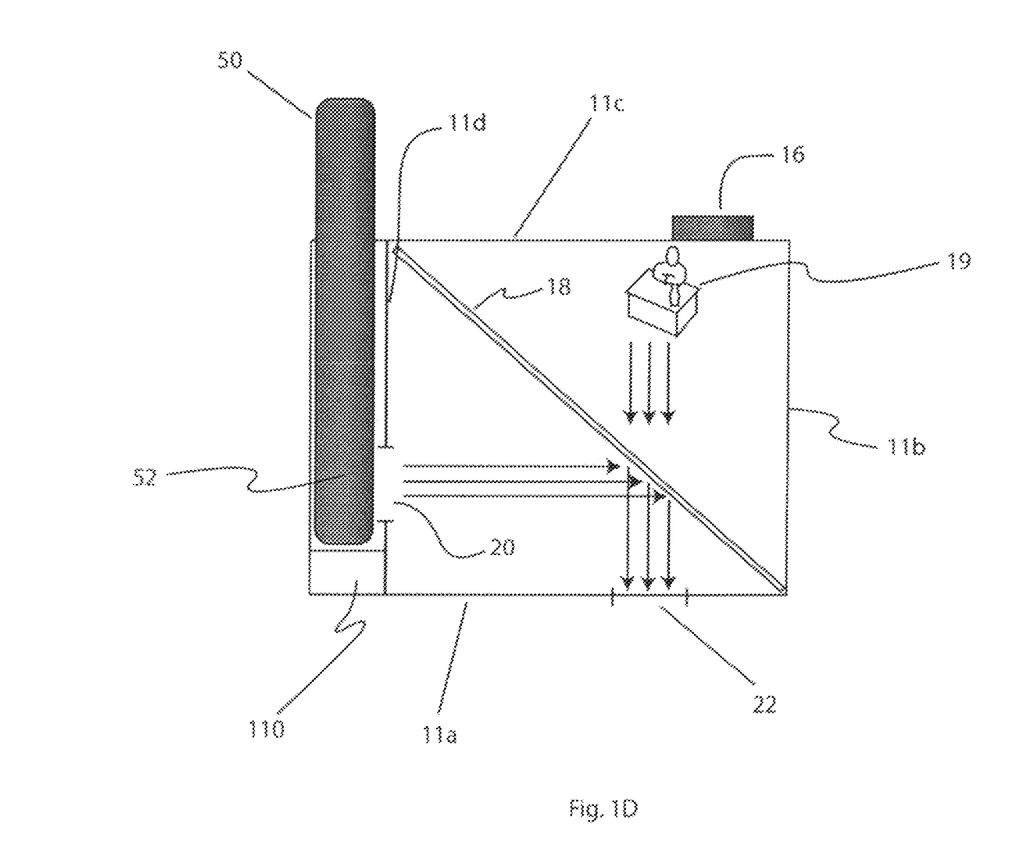
FIG. 1D is a highly simplified cross-sectional top view of a portion of an interactive communication system present in the package of FIG. 1 and in display systems embodying the invention.

Portion 12a will generally have the form shown in FIG. 1D and be referred to as a theater section since it contains means for projecting and reflecting images.

In FIGS. 1, 1A, 1B, and 1C, package 10 is shown for ease of illustration to have a generally solid rectangular shape. The package 10 includes four sides (i.e., 11a, 11b, 11c and 11d). Depending on the function of the side it may be referred to as a front wall, a side wall or a back wall. The package may have a top cover (side or flap or roof) 11e and a bottom wall (side or flap or floor) 11f. The package 10 may include sections 12a and 12b or just section 12a, by itself, to form an enclosure and may be referred to as such in the specification to follow and in the appended claims.

FIG. 1A shows that a selected wall (e.g., side 11a) of the package 10 includes a cut out or recess 15 in portion 12b. A product 14 is positioned, or displayed, within recess 15. FIG. 1A also shows a viewing aperture 22 in portion 12a, also referred to herein as an output aperture, to permit a customer/user to view images being projected within section 12a.

FIGS. 1B and 1C are isometric diagrams showing different views of the package 10. These figures show a window/opening 20, also referred to herein as an input aperture, formed in and/or along side wall 11d in portion 12a. A ledge 110 extends below, and in front of, window 20 to enable an imaging device (50, 52 in FIG. 1D) to be positioned thereon to project an image through window 20 (as discussed below). FIGS. 1B and 1C are shown to include a light input port 24 to enable light to enter and illuminate background scenery 19 in section 12a (as discussed below). FIGS. 1, 1A and 1B also show an ID tag 16 disposed along a side of the enclosure providing a function discussed blow.

FIG. 1D is a simplified top view of "theater" portion 12a showing that portion 12a includes (a) a front section comprised of walls (sides) 11a and 11d; (b) a back section comprised of walls (sides) 11b, 11c; (c) an optical structure 18 located between the front and back sections and effectively dividing them; (d) background scenery 19 which may be formed within the back section and which is generally not visible unless illuminated; (e) an input aperture 20 for enabling images to be projected via the aperture 20 onto the optical structure 18; (f) an output aperture 22 for viewing the image reflected from the optical structure 18 and viewing the background scenery 19 superimposed on the reflected image when the background scenery 19 is illuminated; and (g) a preprogrammed code in ID tag 16 located along a wall of the enclosure.

In the figures the optical structure 18 is shown to be disposed in a generally diagonal manner forming 45 degree angles. But, it should be understood that other angles may be selected. The "theater" portion 12a is shown to be rectangular but it should be understood that any other shapes (e.g., circular, oblong, square) may be equally suitable. The optical structure 18 provides a reflective and transparent surface and may be a film or plastic sheet (treated to provide good reflectivity) which reflects light incident at an angle while also being transparent. That is, optical structure 18 will reflect images projected at an angle on its front surface (the surface facing the input aperture 20) and will be transparent to illuminated objects located in the back section, located behind the optical structure 18 (relative to the input aperture 20 or viewing aperture 22). The optical structure 18 may also be made of any suitable arrangement of prisms, lenses, films or mirrors, or both, positioned to receive images projected at the input aperture 20 and to project a corresponding image at the output aperture 22 while enabling images in back of the optical structure 18 to be visible and superimposed on the reflected image. In FIG. 1D, the plane of the optical structure 18 is set at 45 degrees relative to the front side ad back walls, but this is by way of example only and other angles may be used.

In the Figures, the output aperture (view window) 22 is shown to be located along side (wall) 11a. However, it should be evident that the output aperture (view window) can be located on any other wall, depending on the optical arrangement of the optical structure 18 and any other optical arrangement used. FIG. 1D also shows the presence of a background setting (or scenery) 19 which can be seen by a viewer looking into output window 22. The significance of background setting 19 is that when lit and when an image is projected onto surface 18, a viewer can see the reflected imaged form surface 18 superimposed on the background setting 19.

As noted above, the package 10 includes an ID tag 16, which can be located anywhere on the package. The ID tag may be any suitable indicator of the package and/or the product or the varied materials contained in the package. The ID tag may be a bar code, a QR code, an RFID chip or any like indicator.

By way of example, in accordance with one aspect of the invention, a shopper may use his or her "smart phone" (or equivalent device) 50 to interrogate (scan) the ID tag (e.g., a bar or QR code) 16. The smart phone is programmed to be responsive to the ID tag information and in response thereto to project a series of imaging information via the smart phone's screen 52. The smart phone 50 may be positioned on ledge 110 (or within a slot as in FIG. 1D) with its screen 52 facing the input window 20. Imaging information from the screen 52 is projected onto the reflector 18 which then causes the image to be projected and reflected onto output viewing window (output aperture) 22. Shoppers/users can view the imaging information via viewing window 22. Note that the imaging information may dovetail with, and/or be superimposed on, the background setting 19 set within section 12a. The background setting 19 may be illuminated by skylight 24 and/or by means of light projected from screen 52, when the smart phone 50 (which may be any programmable image projector) is programmed to provide this function.

The imaging information may be selected to pertain to the product 14 or it may be informative or it may be entertaining. The choice of programming may be determined by the entity making the package and offering the product 14 for sale. Displays and packages embodying the invention may be (but need not be) part of a packaging system which promote attention to the package and the product 14 or any of promotional or like materials being offered for sale or display. As already noted, an object 14 is shown mounted within the recess/window 15. However, it should be understood that any promotional material or artifact could be used instead.

In the example above, reference is made to the use of a smart phone. It should be understood that any scanner and transceiver which can perform the desired functions of sensing (scanning) an ID tag and project an image in response to the ID sensing can be used instead.

In FIGS. 1 through 1D the invention was illustrated in the context of a package to display a product. However, it should be appreciated that displays/packages embodying the invention may be used as an invitation, greeting or to send a message or any form of communication or promotion.

Figure 2:
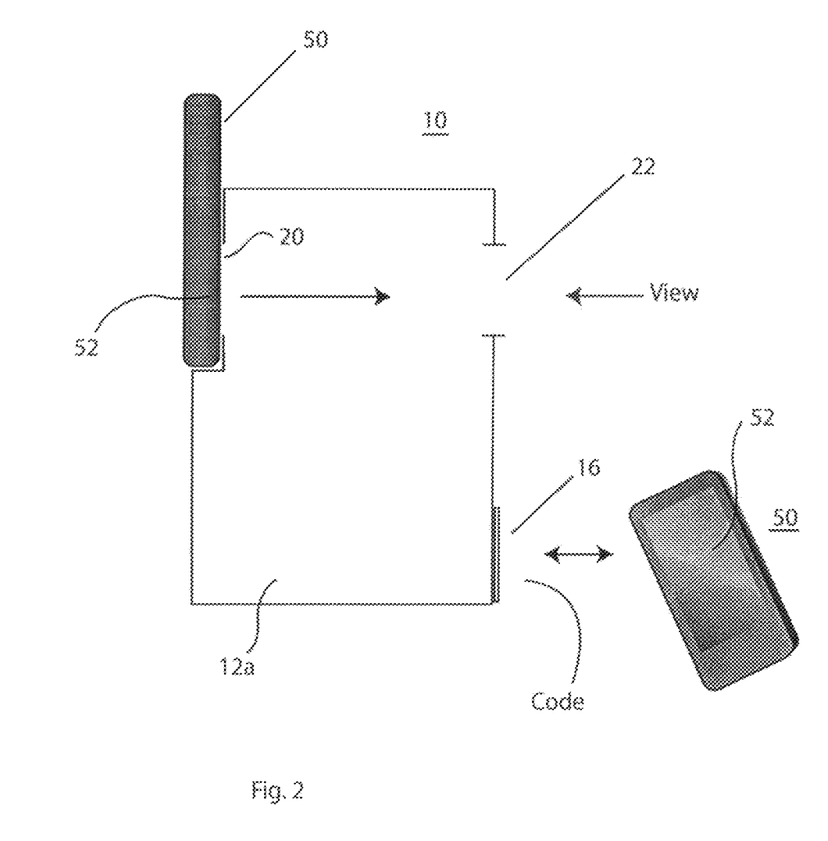
FIG. 2 is another highly simplified cross sectional drawing of a package embodying the invention.

FIG. 2 illustrates a highly simplified version of the invention. In this embodiment the package 10 includes a section 12a in which there is an input projecting window 20 and a viewing (output) window 22. The optical structure 18 has been eliminated. As for the embodiments of FIG. 1, a smart phone (or like device) 50 is used to scan the ID tag 16 and the smart phone can then begin to display imaging information. The smart phone would then be positioned to project an image via window 20 and the image would be projected towards window 22 and/or it could be seen by a viewer looking into window 22.

Figure 3:
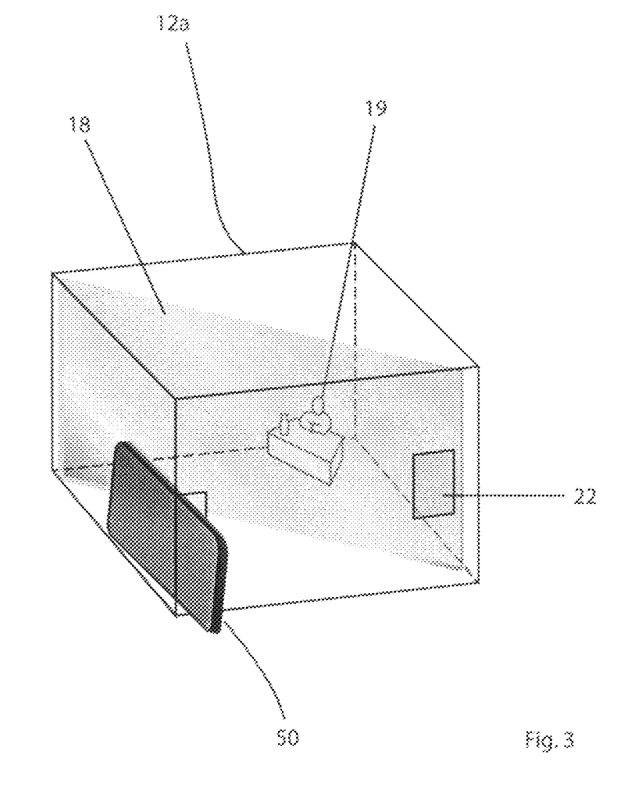
FIGS. 3 and 4 are highly simplified isometric drawings of portions of a package embodying the invention.

FIG. 3, a simplified partial isometric view of a section 12a, shows a section 12a which includes a slot for positioning a smart phone within the section 12a and so that the screen of the smart phone can project an image onto a optical structure 18 set at 45 degrees relative to the side walls. The projected image can be viewed at output view hole 22. Section 12a includes a background object 19. Assume, for example, that the object is a table and a light illuminates the table. The table will then be seen through the view hole and the image appears as a 3D object. Assuming, further, that the smart phone is programmed to project the image of a person eating at the table, the table which appeared previously to be empty now appears as if someone is eating at the table. Note that the inner walls of section 12a may be darkened (made black) to provide greater contrast to enable the desired or projected image to be seen more clearly.

Figure 4:
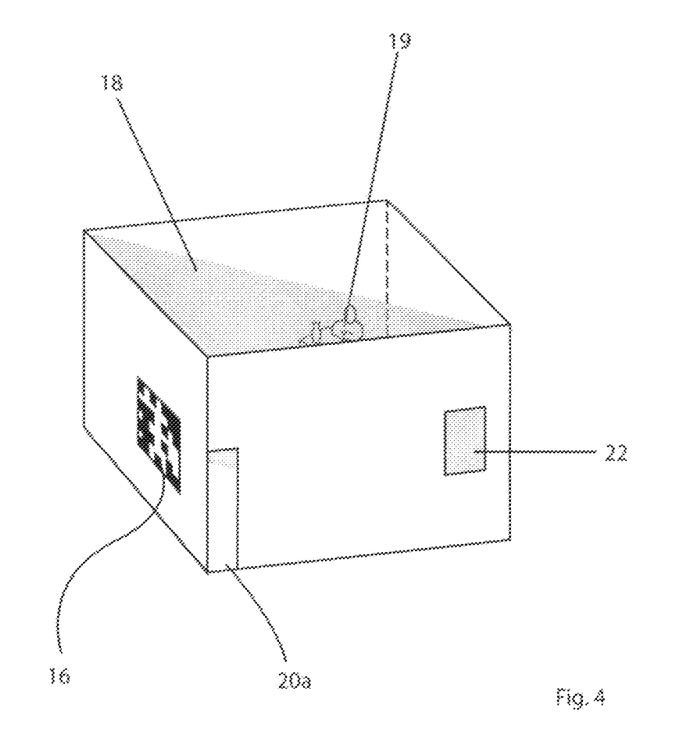

FIG. 4 is another isometric view of a section 12a which shows a preprogrammed coded ID tag 16 to be scanned by a smart phone. FIG. 4 also shows a phone slot 20a for receiving the smart phone 50 and positioning it so its screen 52 projects an image onto optical structure 18 which may be a prism or a film. The projected image is reflected and may be seen from view hole 22. As noted above, the coded tag 16 is read (scanned) by the smart phone to trigger a preprogrammed sequence of images to be projected. The smart phone is then inserted in phone slot 20a.

Figure 5:
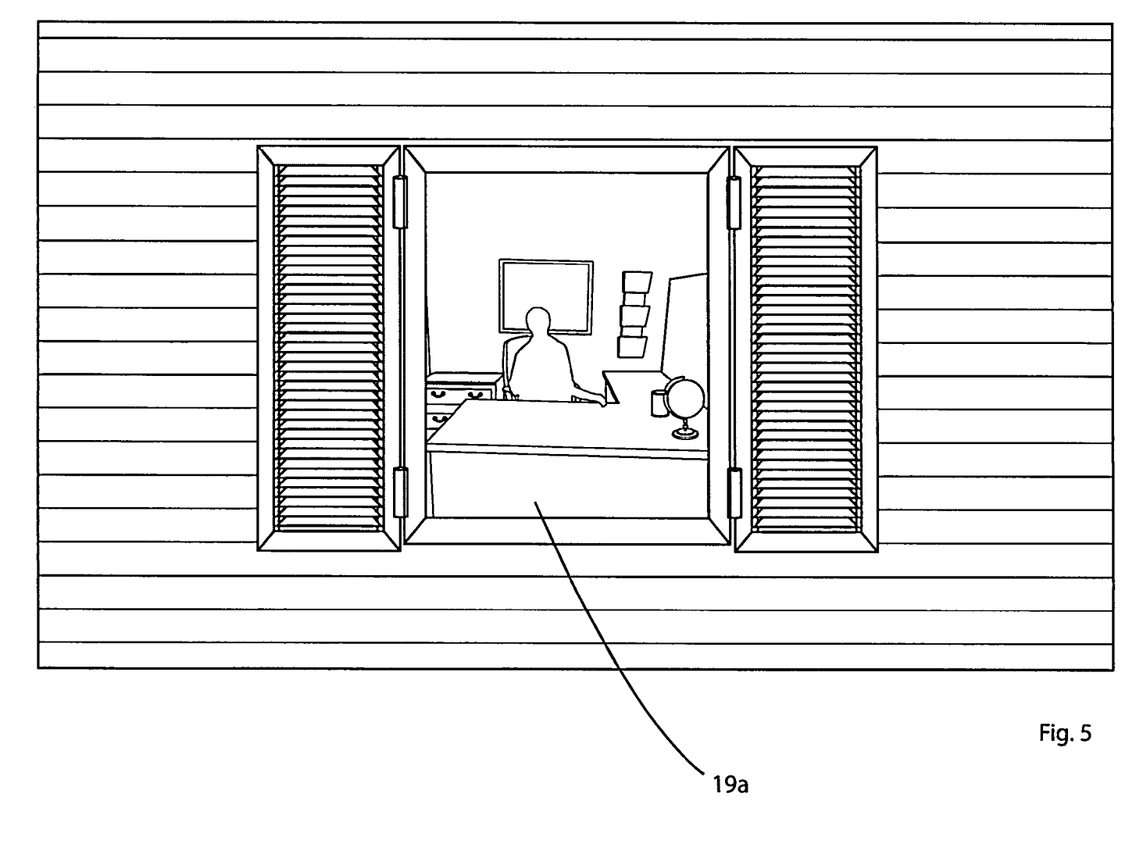
FIG. 5 is a drawing of background scenery that may be used in packages embodying the invention.

FIG. 5 shows a background image 19a. The background scene can include any image or object which may be used in conjunction or integrated with the images projected by the smart phone and to further the purpose of the product or materials associated with the package 10.

As already noted displays and packages embodying the invention may take any suitable or desired form. By way of example, a package functioning as an invitation to a wedding may be in the form of an altar, wedding cake, church or synagogue. A baseball fan may have a package shaped like a baseball stadium including a baseball. In short the package 10 may have any imaginable shape.

Figure 6:
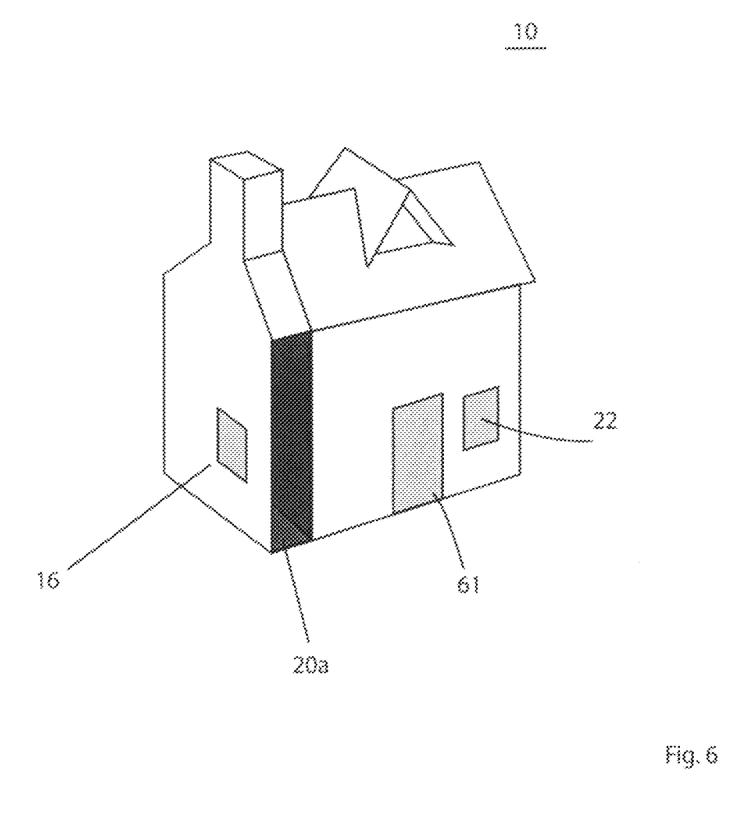
FIG. 6 is a simplified isometric drawing of a package which may be used to practice the invention.
Figure 6A:
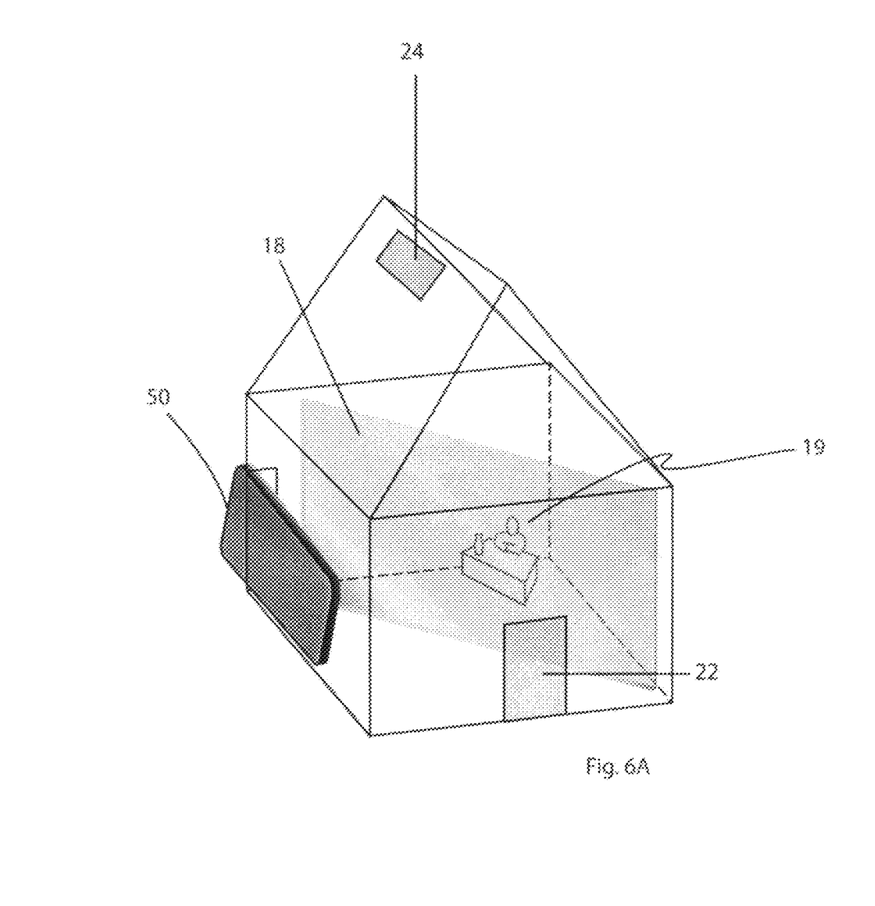
FIG. 6A is a top view of the roof of FIG. 6 with a skylight to illuminate the background scenery.

FIGS. 6 and 6A illustrate that the package 10 may be shaped like a house. It should be noted that the package 10 is shown as a house for illustrative purposes only. The package 10 includes any suitable coded ID tag 16 which can be scanned by a smart phone (or any device which can scan and decode the coded information). The smart phone 50 or any transceiver which can receive and project images is then inserted into the phone slot 20a so its screen 52 can project the received images onto an internally located optical structure 18 as shown in FIG. 6A (and others) contained within the house package. The package 10 includes a viewing aperture 22 to view the reflected images. Note that the package/house 10 has a door 61 which may be opened or closed to provide access to an object (not shown) behind the door which can be offered for sale or display. FIG. 6A shows that the roof of the house may include a skylight 24 to illuminate the background scenery 19 located within the house as shown in FIG. 6A and in FIGS. 1D, 3 and 4.

Note that the package of FIG. 6 may, for example, be used by realtors to display a house for sale, by insurance brokers to indicate services they can render, as an invitation to visit by a homeowner customizing the package to resemble his house, or any other purpose.

Figure 7:
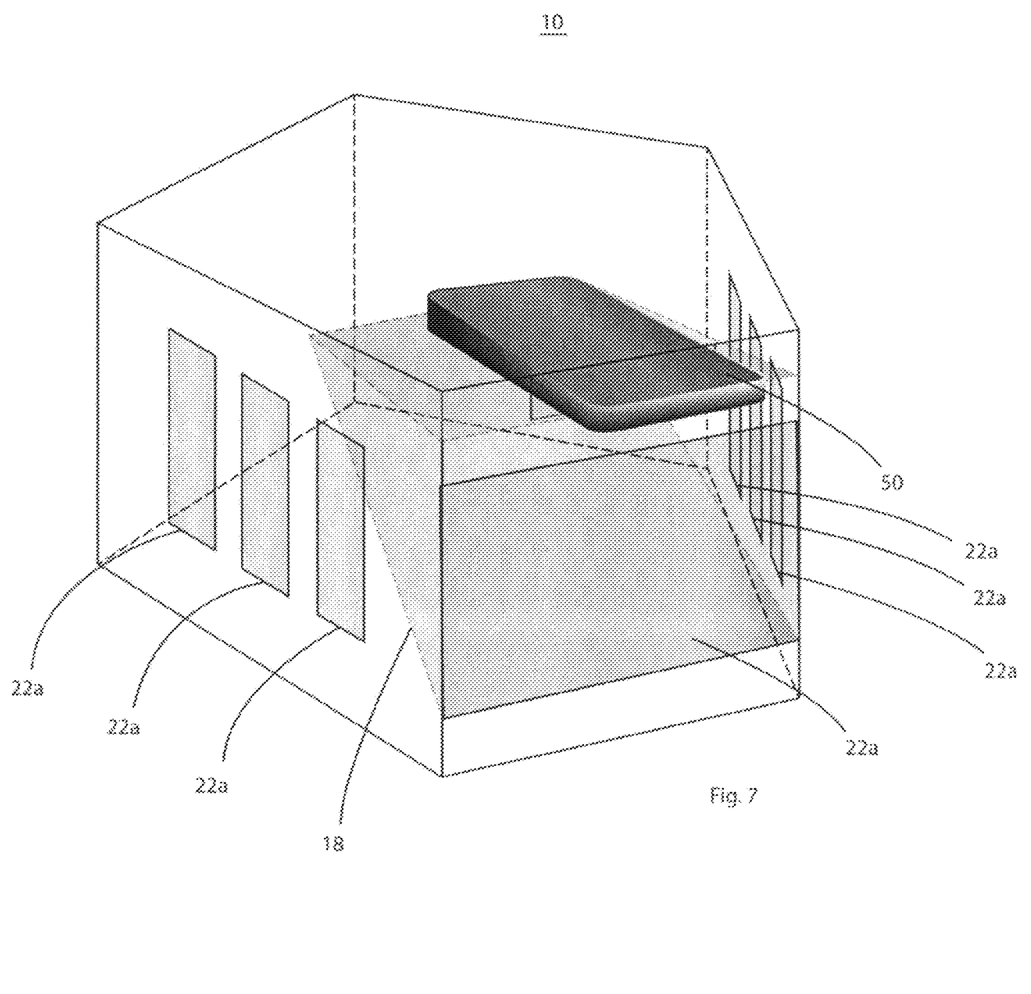
FIG. 7 is an illustrative drawing of a five sided structure embodying the invention.
Figure 7A:
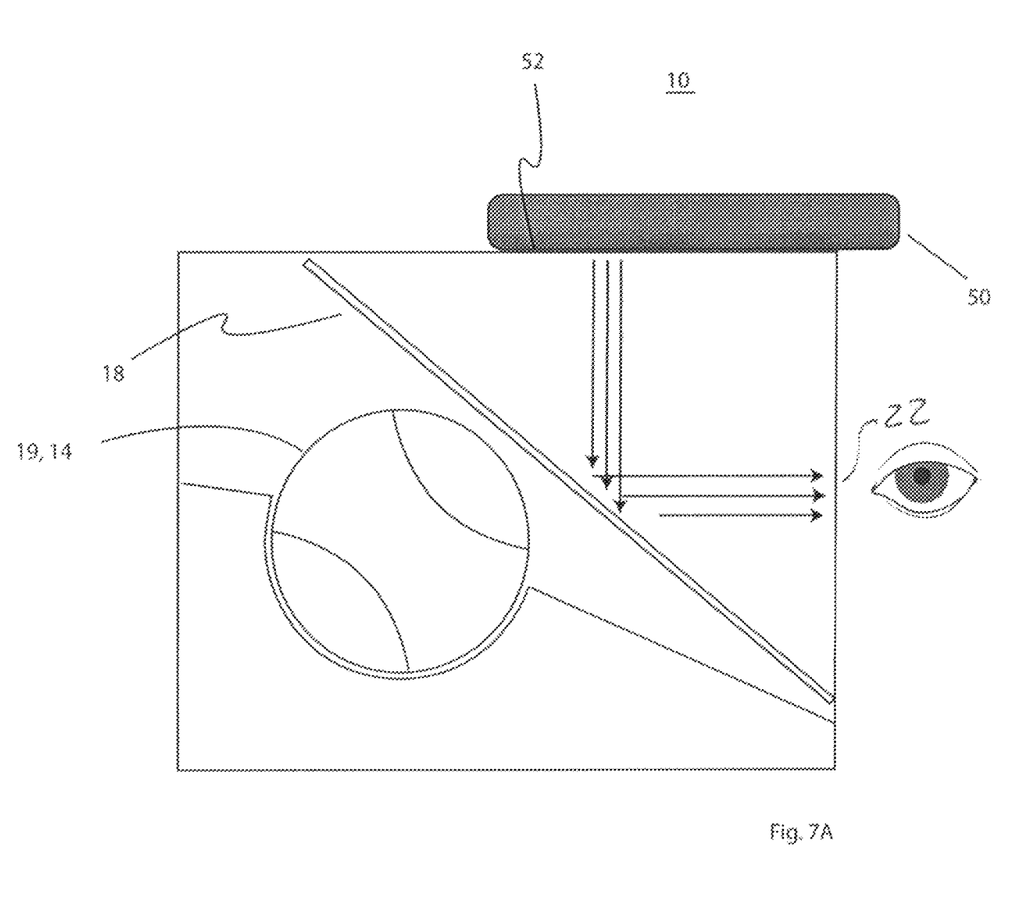
FIG. 7A is a simplified schematic rendition of the structure of FIG. 7 illustrating an intended use.

FIG. 7 shows a package shaped like a pentagon which may be representative, for example, of a baseball stadium. In FIG. 7 the image projector 50 extends above the optical structure 18 which may be oriented to reflect light onto a number of different apertures 22a. For this embodiment the background scenery 19 may include, or be, an object 14 which is offered for sale or for display. Thus the recess 15 and object 14 are part and parcel of an enclosure 12a defining the package 10. By way of example the object 14 could be a baseball. The viewer would thus see at output aperture 22 images projected from projector 50 reflected from optical structure 50 which are superimposed on images of a baseball.

It has thus been shown that packages embodying the invention may be used for many different purposes and may be also be sued as greeting cards, birthday cards or for entertainment or amusement purposes.

What is claimed is:

1. A display system comprising:
an enclosure having a front section and a back section and an optical structure having transparent and reflective characteristics extending between the front and back sections; said optical structure functioning to reflect light incident at an angle from the front section while permitting transmission of images from the back section;
an input aperture formed within the front section for enabling an image projector to project images at an angle onto said optical structure for reflecting the projected image;
background scenery formed within the back section;
a viewing aperture located along the enclosure for viewing the superposition of the reflected image and the background scenery; and a programmed code located exteriorly to a wall of the enclosure for enabling an image projector to sense the programmed code and project an image onto the optical structure corresponding to said programmed code.

2. A display system as claimed in claim 1, wherein the enclosure has a front wall, two side walls and a back wall and wherein an optical structure is located along a line extending at an angle, relative to the input aperture, between two walls of the enclosure; and wherein the optical structure is one of a film, plastic sheet, prism or any suitable arrangement of lenses, films or mirrors, or both, positioned to receive images projected at the input aperture and to reflect a corresponding image toward the viewing aperture.

3. A display system as claimed in claim 2, wherein the enclosure includes a section for holding and displaying selected products.

4. A display system as claimed in claim 2, including means for selectively illuminating the background scenery and wherein the programmed code and the background scenery are designed to correspond to each other.

5. A display system as claimed in claim 2, wherein the programmed code is one of a bar code, a QR code, or an RFID chip.

6. A display system as claimed in claim 5 wherein said optical structure functions to reflect the image projected thereon while permitting the background scenery to be seen.

7. A display system as claimed in claim 2, wherein the programmed code is programmed to cause an image projector to project an image onto the optical structure and to concurrently illuminate the background scenery.

8. A display system as claimed in claim 2 wherein the means to project an image includes an image projector which can be selectively activated to project an image via said input aperture.

9. A display system as claimed in claim 8 wherein the image projector is a smart phone.

10. A display system as claimed in claim 1, wherein the enclosure is shaped like a house and wherein said house has a roof and wherein said roof has an opening for enabling ambient light to illuminate the background scenery.

11. A display system as claimed in claim 1 wherein said input aperture includes a slot for positioning the image projector within the slot.

12. A display system comprising:
an enclosure having a front wall, a back wall and opposite side walls defining an interior enclosed space;
an input aperture formed within one of the walls for enabling an image projector to be inserted within the enclosure for projecting an image onto an optical structure located, within the enclosure, opposite the input aperture and at an angle thereto; said optical structure for reflecting the projected image while being transparent to objects behind the optical structure;
background scenery formed within the enclosure, said background scenery being located so the optical structure is between the background scenery and the input aperture; and
a viewing aperture located along the enclosure for viewing the superposition of the reflected image and the background scenery.

13. A display system as claimed in claim 12, wherein the optical structure is located along a line extending at an angle between two walls of the enclosure; and wherein the optical structure is any suitable arrangement of lenses, films, plastic sheet or mirrors, or both, positioned to receive images projected at the input aperture and to reflect a corresponding image toward the viewing aperture.

14. A display system as claimed in claim 13, wherein a programmed code is affixed exteriorly to a wall of the enclosure; and wherein said image projector includes means for sensing the programmed code and for projecting an image onto the optic structure corresponding to said programmed code.

15. A display system as claimed in claim 13, wherein the enclosure includes a section for holding and displaying selected products.

16. A display system as claimed in claim 12 wherein the means to project an image includes an image projector which can be selectively activated to project an image via said input aperture.

17. A display system as claimed in claim 16 wherein the image projector is a smart phone.

18. A display system as claimed in claim 12 wherein said input aperture includes a slot for positioning the image projector within the slot.

19. A display system as claimed in claim 12, wherein a programmed code is affixed exteriorly to a wall of the enclosure; and wherein said image projector includes means for sensing the programmed code and for projecting an image onto the optic structure corresponding to said programmed code.

20. A display system as claimed in claim 12, including means for selectively illuminating the background scenery.

* * * * *